Feb. 16, 1926.  1,573,589

A. VANDERVELD

RETURN SPEED CHECK FOR MEASURING MACHINES

Original Filed Feb. 26, 1923   4 Sheets-Sheet 1

Inventor
Anthony Vanderveld
By Frank E. Liverance Jr.
Attorney

Feb. 16, 1926.

A. VANDERVELD 1,573,589

RETURN SPEED CHECK FOR MEASURING MACHINES

Original Filed Feb. 26, 1923    4 Sheets-Sheet 2

Inventor
Anthony Vanderveld
By Frank E. Liverance, Jr.
Attorney.

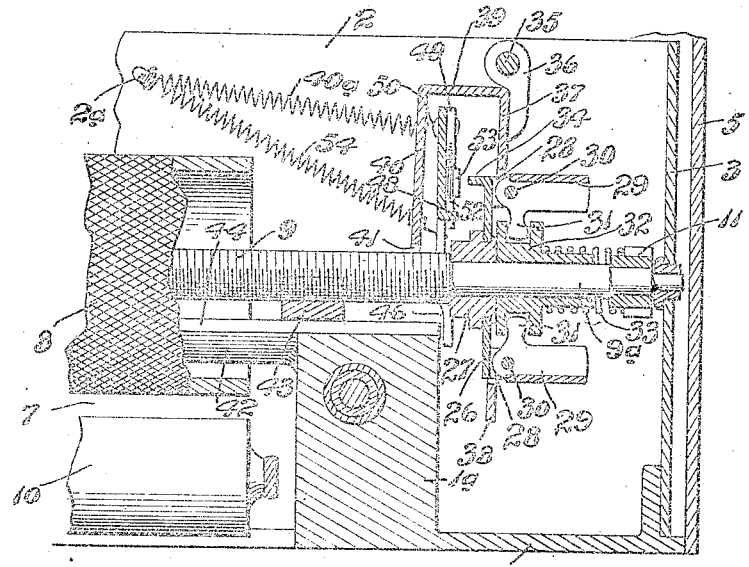

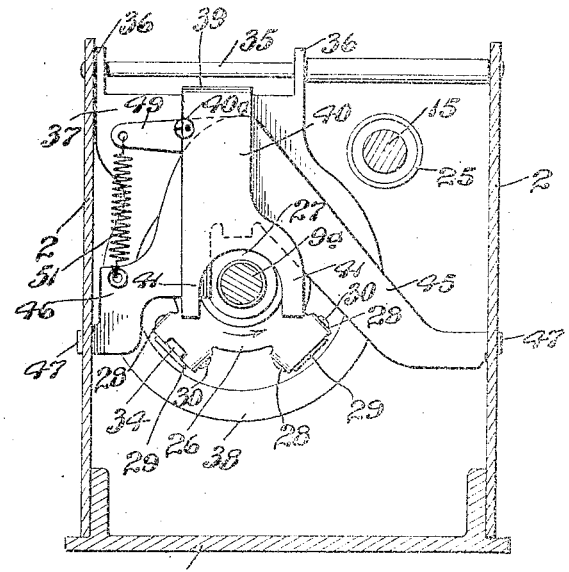

Patented Feb. 16, 1926.

1,573,589

UNITED STATES PATENT OFFICE.

ANTHONY VANDERVELD, OF GRAND RAPIDS, MICHIGAN.

RETURN-SPEED CHECK FOR MEASURING MACHINES.

Application filed February 26, 1923, Serial No. 621,269. Renewed January 6, 1926.

*To all whom it may concern:*

Be it known that I, ANTHONY VANDER-VELD, a citizen of the United States of America, residing at Grand Rapids, in the county of Kent and State of Michigan, have invented certain new and useful Improvements in Return-Speed Checks for Measuring Machines; and I do hereby declare the following to be a full, clear, and exact description of the invention, such as will enable others skilled in the art to which it appertains to make and use the same.

This invention relates to cloth or ribbon measuring machines and is concerned with improvements in the construction disclosed in my Patent No. 1,420,612, issued June 20, 1922. In such machine a measuring roller is actuated by the cloth or ribbon measured and in its movement tensions a spring which serves to return the said measuring roller and parts of the machine connected and actuated thereby to initial zero position when the roller is released and free to return. Particularly, when the amount measured is considerable in a measuring operation, the spring is tensioned to a relatively high degree and the return of the parts to initial position is fast and a considerable momentum is produced in the moving parts which must be overcome and obviated before the mechanism is brought to a complete stop at initial position, and in the structure shown in my patent aforesaid, a shock absorbing appliance is used having yielding means to absorb the shock of stopping the mechanism. This shock absorbing mechanism is practical for the purpose but there is considerable rebound and movement back and forth of the mechanism to and from initial zero position before it comes to rest at such position. It is a primary object and purpose of the present invention to provide an automatic brake which is ineffective during the major part of the return of the parts of the mechanism to original position, but which is automatically brought into service as the parts approach their initial position to act thereon and check the speed so that when the initial zero position is reached, the mechanism is nearly stopped and the momentum thereof is practically all absorbed. This allows the return of the parts to original position at as high a speed as the spring can drive them until the end of the return run is approached, the brake then acting to check the speed and bring it down to a point such that the stopping of the mechanism at initial zero position is accomplished without jar or rebound of the parts and without loss of time in bringing the mechanism to a stop. In fact the speed of return of the mechanism is at a maximum at all times except for the final portions thereof, and the checking of the speed at such points is a time saver in that when the stopping is done, no oscillations of the mechanism occurs but the stopping is completed at once. My invention consists in many novel constructions and arrangements of parts for effectively accomplishing this result as will fully appear as understanding of the invention and the constructions embodying the same is had from the following description, taken in connection with the accompanying drawings, in which, Fig. 1 is a longitudinal vertical section through the machine made in accordance with my invention.

Fig. 4 is a fragmentary longitudinal vertical section through the brake mechanism and stop means associated therewith.

Figure 1:
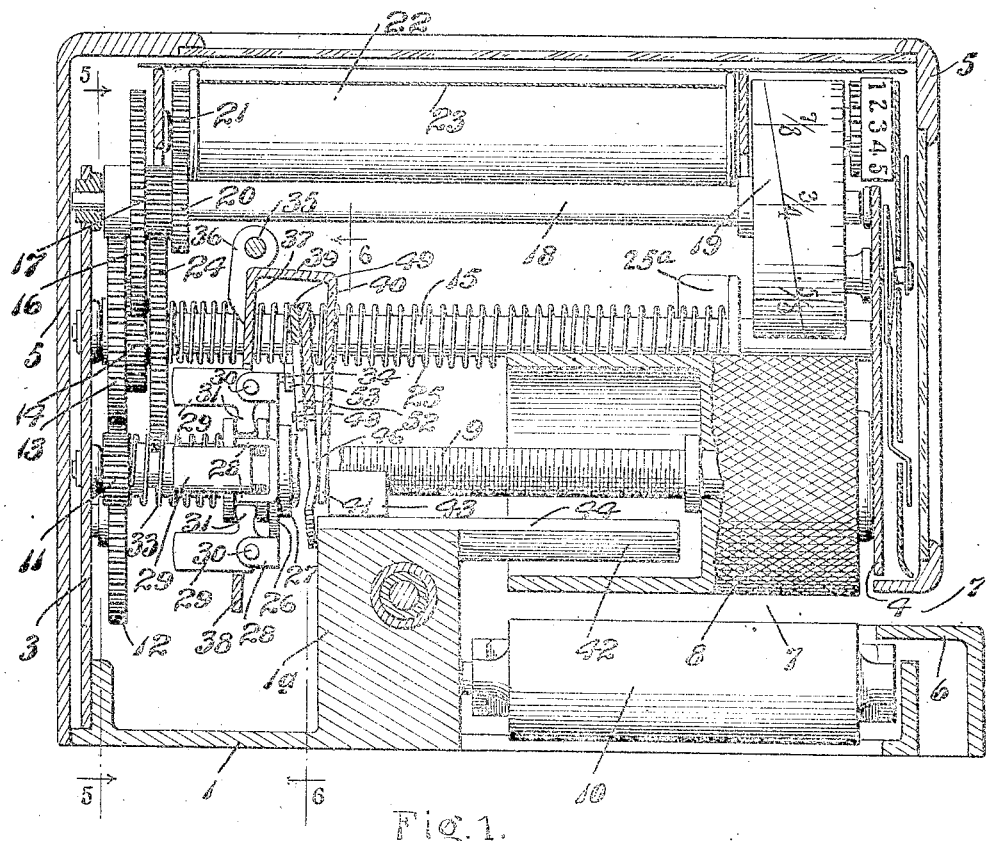

Figs. 5 and 6 are transverse vertical sections through the machine, taken on the planes of lines 5—5 and 6—6, respectively, of Fig. 1.

Fig. 7 is an elevation of the pivotally mounted and depending brake member, and

Fig. 8 is a like view of the stop member associated therewith.

Like reference characters refer to like parts in the different figures of the drawings.

In the construction of the machine, a base 1 is used having side flanges extending upwardly to which spaced apart vertical sides 2 are secured at their lower edges. Similarly a rear vertical end 3 is secured and a front plate 4 is disposed between the front ends of the side plates 2 and connected thereto. This makes a supporting frame on which the mechanism is mounted, the whole being covered and enclosed by a covering casing 5 having openings with glass therein for disclosure of the measuring and computing indicia of the machine. At the lower front portion of the machine a table member 6, completing the casing is positioned, there being a horizontal slot 7 between the upper side of the table and the overhead portions of the main casing and measuring roller into which slot the cloth or ribbon is to be introduced for measurement.

The measuring roller 8 is located horizontally over the table 6 and is secured on a horizontal shaft 9 suitably mounted for rotation at its ends in bearings carried on the end plates 3 and 4. Below the measuring roller a presser roller 10 is mounted in parallelism to the measuring roller and is adapted to press the cloth or ribbon against the roller 8 when actuation of the machine by the cloth or ribbon is to take place, said presser roller and its mounting being housed under the table 6. The specific manner of operating this presser roller into and out of operative position is not new in the present invention and is not shown and described, being fully outlined in my patent above noted. It is enough to understand that the presser roller in operative position presses the cloth or ribbon against the measuring roller so that on drawing the cloth or ribbon longitudinally between the rollers, the measuring roller is driven by the cloth, thereby operating the mechanism associated with the said measuring roller, and that the presser roller is adapted to be moved away from the measuring roller to free the cloth for removal and permit the measuring roller to return to original or initial position.

At the rear end portion of the shaft 9 a pinion 11 is fixed in front of the end plate 3 and is in mesh with an idler 12 mounted on the plate 3, it in turn engaging with a gear 13 which, together with a smaller gear or pinion 14 located in front of gear 13 and attached thereto, is loosely mounted on and at the rear end of a shaft 15 positioned horizontally between the plates 3 and 4 and rotatably mounted at its ends on said plates. The gear 14 meshes with a gear 16, said gear and a pinion 17 in front thereof being attached to a second shaft 18 paralleling the shaft 15 and similarly mounted. An indicating drum 19 is carried on shaft 18 near its front end for indicating lengths of cloth passed through the machine, the dimensions of the measuring roller and design of the gearing being such that shaft 18 makes one complete revolution with each unit length of the cloth or like material passed between the rollers 8 and 10.

A pinion 20 is also secured on the shaft 18 and drives another pinion 21 on the end of one roller 22 of a pair of rollers on which a computing chart 23 is mounted for movement in accordance with the amount of cloth passed through the machine and as fully outlined in my prior patent. A gear 24 is fixed on shaft 15, being in engagement with and driven by pinion 17. A coiled spring 25 is secured at one end to the gear and is located around the shaft 15, at its opposite end being secured to any suitable stationary member or bracket, as shown at $25^a$ whereby when the mechanism is operated, the spring is tensioned and accumulates power which serves to drive the mechanism in the reverse direction when free to do so, returning the same to original position.

Adjacent the rear portion of the shaft 9 it is reduced in diameter, making a part $9^a$. A disk 26 is fixed to a hub 27 secured on the reduced portion $9^a$ of the shaft, and said disk at a plurality of spaced apart points has outward extensions from which pairs of ears 28 are bent at right angles to the rear. Between each of the pairs of ears members 29 formed from sheet metal and substantially channel-like in cross section are positioned and pivotally mounted on pivot pins 30 extending between the ears, said members extending to the rear from the pivots. The sides or flanges of the members 29 are formed near the pivots with inwardly extending lugs 31 which enter an annular groove in a collar 32 mounted on the part $9^a$ and pressed by a light spring 33 against the hub 27, the spring being located between the pinion 11 and said collar. One of the extensions on the disk from which the ears 28 are turned is formed with a forwardly turned stop lug 34. It is evident that when the shaft 9 is rotated rapidly there is a tendency for the members 29 to throw outwardly and turn about their pivots 30, due to centrifugal force.

A rod 35 is disposed between the sides 2 of the supporting frame above the mechanism just described. Ears 36 on a plate 37 formed at its lower portion with a ring-like form, as indicated at 38 are used to pivotally suspend the plate from the rod. The ring portion 38 is located around the shaft 9 and the mechanism mounted on the reduced portion $9^a$ thereof. At its upper edge an arm 39 is turned at right angles forwardly for a distance from the plate 37 and then turned downwardly at right angles making an arm 40 which at its lower end is divided to make two downwardly extending parts 41, one passing at each side of the shaft 9. A spring 40ª is attached at one end to the arm 40 and at its other end to a lip 2ª struck from one of the side plates 2, as shown in Fig. 4, said spring normally serving to draw the plate 37 forwardly so as to remove the ring portion 38 away from the outwardly throwing members 29. Accordingly the mechanism is normally free to rotate without any action being imparted to the members 29 to frictionally stop the same and the shaft on which they are mounted from rotation.

Figure 2:
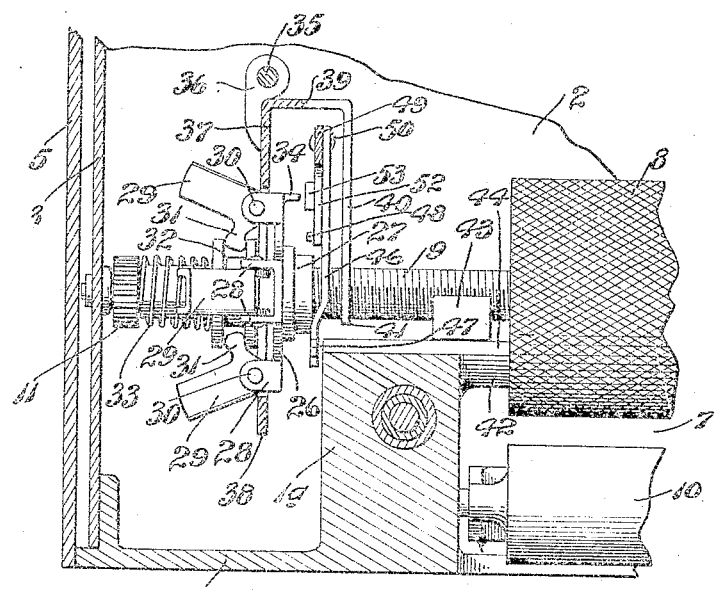
Fig. 2 is a fragmentary like section showing the parts as the same appear when the mechanism is returning at full speed to initial position, the parts as shown in Fig. 1 being at such initial position.
Figure 3:
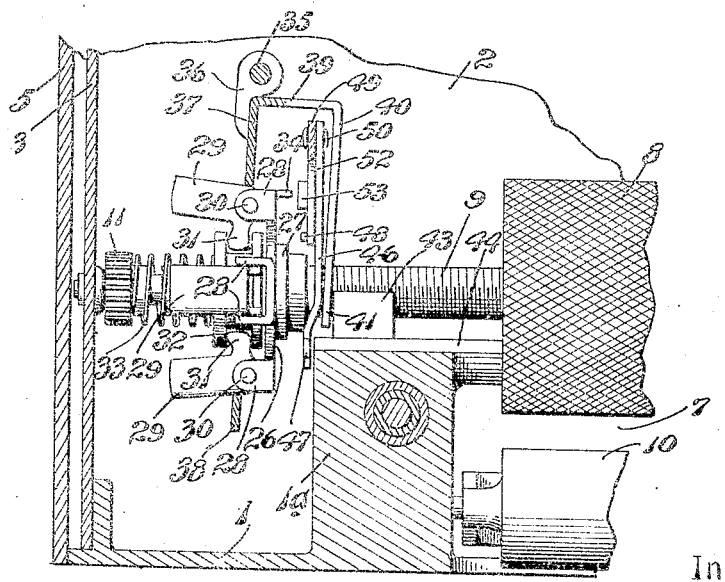
Fig. 3 is a like view with the parts approaching initial zero position and with the brake being brought into action.

From the upper side of the base 1 an integral block or post 1ª extends upwardly, it having a horizontal member 42 cast therewith and extending into the end of the measuring roller parallel and under the shaft 9. The shaft 9 is threaded for the intermediate portion of its length and a block 43 is slidably mounted to traverse guides 44 in the upper side of the post 1ª and the member 42 under the shaft, the upper side of said block being recessed and threaded to engage with the threads on the shaft, making in effect a half-nut which moves back and forth with the rotation of the shaft 9 in different directions, the same moving forwardly when the machine is operated and returning on return of the parts to initial position. It will be noted that when the machine is returning to initial position after a length of cloth or like material has been passed therethrough and measured, as the mechanism approaches such initial position, the block or half-nut 43 comes against the depending parts 41, serving to tilt the plate 37 and its lower ring portion 28 to the rear about pivot rod 35, the ring portion 38 passing over the inner ends of the members 29 and engaging frictionally with the outer sides thereof, this serving to check or brake the speed of rotation of the mechanism. In Fig. 2, the outwardly flung position of the members 29, as the same appear with the mechanism rotating at full speed in its return to initial position, the members 29 being thrown outwardly through centrifugal action. In Fig. 3, the braking action of the ring portion 38 in its engagement with the said members 29 is illustrated, the frictional engagement of said members with the ring part 38 rapidly checking the rotative speed of the shaft 9 and causing a quick but gradual diminishing of the speed as approach is made to the point where the machine must stop at zero position.

After the return speed of motion of the machine is thus checked, the absolute stop mechanism for stopping the machine at an exact point or at zero position is brought into use. This stop mechanism includes an irregularly shaped member formed from sheet metal and including opposite sides 45 and 46 (see Fig. 8) positioned at an angle to each other making a substantially inverted V-shaped form, the lower ends of the sides 45 and 46 being provided with horizontally extended lugs 47 which pass through openings in the opposite sides 2 of the supporting frame, the connection being loose to permit a limited tilting movement of said irregularly shaped member about the lugs 47 as pivots. At the under side of the apex of the member a lug 48 is turned rearwardly, extending toward the disk 26. An arm 49 is pivotally mounted at one end at 50 at the apex of the said member, a spring 51 being connected to the free end of the arm and to the side 46. An arm 52 extends downwardly from the arm 49 at a point between its ends, the spring 51 serving to bring the lower end of arm 52 against the lug 48. At a point above the lower end of said arm 52, an off-set finger 53 is struck, being so located that when the stop mechanism is moved to proper position it interposes in the path of movement of the stop lug 34 on the disk 26. A spring 54 (see Fig. 4) is attached to the irregularly shaped member at one end and at the other to the lip 2ª aforesaid, the normal tendency of which is to draw the said member forwardly so that lug 34 may rotate freely without interference by the stop lug 53, as shown in Fig. 4.

As the speed of rotation of the return of the mechanism is checked by block 43 coming against the parts 41, the continued further movement of the block brings one of the parts 41 against a widened portion 46ª of the side 46 of the irregularly shaped member, whereupon the said member is tilted to the rear and the lug 53 shortly brought into the path of movement of the lug 34 which, striking against said lug 53 stops the rotation of the shaft 9 completely. Spring 51, of course serves to permit a slightly yielding or shock absorbing stop for the moving parts so that immediate and rigid stopping with resultant strains is obviated. But practically immediately the mechanism is stopped at an exact initial or original zero position of the machine from which point measurement of the cloth or ribbon in the machine is to start.

This construction is comparatively simple, exceptionally durable and serviceable and not liable to get out of order. The return of the mechanism after a measuring operation to original initial position may be at high speed with a saving of time, said speed being automatically checked just before reaching original stopping position, with a positive stop to stop the mechanism at a predetermined original position from which point all measurement of cloth or like material starts. The parts of the machine novel in this invention are formed from sheet metal chiefly at low cost of manufacture. In every way the automatic brake brought into action at the last portion of the return movement of the mechanism has proved particularly satisfactory and practical. The appended claims define the invention and all forms of structure coming within their scope are to be considered as comprehended by my invention.

I claim:

1. In a cloth measuring machine, a roller adapted to be driven by contact of cloth therewith drawn thereby, spring means tensioned by the driving of said roller tending to return the same to initial position when free to do so, means for stopping the mechanism at an exact and predetermined position on said return, and means for automatically checking and slowing the return speed of rotation of the machine immediately prior to the stopping thereof, substantially as described.

2. In a machine of the class described, mechanism adapted to be driven in one direction by cloth or like material being drawn lengthwise therethrough, means tensioned by the operation of the mechanism by said material tending to return the mechanism to initial position when free to do so, and means normally inoperative automatically moved to operative position slightly prior to the time the mechanism reaches said initial position for checking and slowing the speed of movement of said mechanism to said initial position, substantially as described.

3. In a machine of the class described, a roller adapted to be driven by contact of cloth therewith drawn thereby a shaft on which the roller is fixed, members mounted on the shaft and adapted to be thrown outwardly through centrifugal force on rapid rotation of the shaft, spring means tensioned by the driving of the roller and acting to return the roller and shaft to initial starting position when free to do so, and means normally out of operative engagement with said members but moved to frictionally engage therewith slightly prior to the time the said roller and shaft reach said initial starting position on return whereby the same are checked and slowed in speed, substantially as described.

4. In a machine of the class described, a measuring roller against which cloth or like material is pressed and by which it is drawn to drive the roller, mechanism operated by the rotation of the roller, a threaded shaft on which the roller is secured included in said mechanism, a member engaged with the shaft and movable along the same during the operation of the machine, spring means tensioned by the operation of the machine for returning the same to initial position when free to do so, means mounted on the shaft, and means movably mounted and normally out of engagement with said means on the shaft but moved into engagement therewith by said member as the same approaches its initial position whereby the speed of rotation of the return movement of the said roller, shaft and mechanism is checked immediately prior to reaching said initial position.

5. In a machine of the class described, a measuring roller adapted to be driven by frictional contact of cloth or like material therewith, a threaded shaft on which the roller is mounted, a spring operatively connected with the shaft for tensioning thereby so that the spring will return the shaft and attached roller to initial starting position when free to do so, a disk on the shaft, a plurality of members pivotally connected with the disk and substantially paralleling the shaft, said members moving outwardly on rapid rotation of the shaft, a member engaged with the threaded shaft and movable along the same on rotation thereof, means located around the disk and movably mounted to move into or out of engagement with said members on the disk, yielding means normally moving said means around the disk out of engagement with said members, said means around the disk being automatically moved to engaging position with said members on the disk by said shaft engaging member as it approaches its initial starting position, substantially as described.

6. In a machine of the class described, a measuring roller adapted to be driven by frictional contact of cloth therewith, a threaded shaft on which the roller is fixed, a spring, means between the spring and the shaft whereby rotation of the shaft in one direction tensions the spring, a disk on the shaft, a plurality of members pivotally connected to the disk adjacent one end and extending substantially parallel to the shaft when at rest, said members swinging outwardly on rotation of the shaft, a member engaged with the shaft and moved lengthwise thereof when the shaft is rotated, a plate pivotally mounted to swing on a horizontal axis transverse and above the shaft, said plate having a ring-shaped portion to pass around the disk and members attached thereto, yielding means normally drawing said plate in one direction to bring the ring-shaped portion away from operative engagement with said members, and means attached to the plate against which the member engaged with the shaft presses to move the said plate into position for the ring-shaped portion thereof to embrace the said members on the disk and frictionally check the speed of rotation of the shaft, substantially as described.

7. In a machine of the class described, a support including a base and two side plates and two end plates attached to and extending vertically therefrom, a shaft rotatably mounted horizontally between the end plates, means for driving the shaft in one direction, spring means tensioned by the rotation of the shaft in said direction for returning it to initial position when free to do so, devices carried on the shaft adapted to throw outwardly through centrifugal action on rapid rotation of the shaft, means movably mounted adjacent said devices for movement into and out of operative engagement therewith, yielding means normally holding said means out of engagement with said devices, and means movable by the shaft into engagement with said movably mounted means to move the same into engaging position with respect to said devices on return rotative movement of the shaft and at a point slightly prior to initial starting position being reached by the shaft.

8. In a machine of the class described, a measuring roller, a rotatably mounted shaft on which the roller is fixed, said roller and shaft being adapted to be driven in one direction by frictional contact of cloth drawn by and against the roller, means tensioned by the rotation of the roller and shaft in said direction normally tending to return the same to initial starting position and returning the same when free to do so, means normally held in inoperative position for engaging with means on the shaft immediately prior to its arrival to initial starting position to check the speed of rotation of the shaft on its return movement, and means for automatically moving said engaging means into operative position immediately prior to the arrival of the shaft and roller to initial starting position, substantially as described.

9. A machine having the elements in combination defined in claim 8, combined with means for stopping the shaft at said initial starting position immediately after said speed of rotation thereof has been checked.

10. A machine having the elements in combination defined in claim 8, combined with movably mounted stopping means, means normally holding the stopping means away from operative position, said means which automatically moves the engaging means into operative position, on further movement automatically moving the stopping means into operative position to stop the shaft at initial starting position.

11. In a machine of the class described, mechanism adapted to be driven in one direction by cloth or like material being drawn lengthwise therethrough, said mechanism including yielding means tensioned by the operation of the mechanism by said material whereby the mechanism returns to initial starting position when free to do so, means normally inoperative automatically moved to operative position slightly prior to the time the mechanism reaches said initial starting position on its return for checking and slowing the speed of movement of the mechanism thereafter to initial starting position, a movable mounted stopping means automatically moved to operative position immediately after the accomplishment of the checking and slowing of said speed of movement, and yielding means connected with the stopping means normally tending to hold it in inoperative position, substantially as described.

12. In a machine of the class described, a rotatably mounted shaft, a measuring roller thereon adapted to be driven by frictional contact of cloth or like material drawn thereby, spring means tensioned by the rotation of the shaft in one direction for returning the same to initial starting position when free to do so, a member attached to the shaft having a stop lug thereon, a member mounted over the shaft for tilting movement toward or away from the said stop lug, means normally moving said member away from the stop lug, means for moving said member toward the lug substantially at the time the shaft reaches starting position on its return movement, and means on said member moved into the path of movement of said stop lug to stop the shaft from movement at initial starting position.

13. In a machine of the class described, a base, sides and ends carried by the base, a shaft mounted for rotation on and between the ends, a member attached to the shaft provided with a projecting stop lug, means for rotating the shaft in one direction, spring means for returning the shaft to initial position, a member mounted for limited tilting movement on and between the sides, a spring normally moving the member away from the stop lug, a member movable along the shaft as it is rotated said member on the return movement of the shaft engaging against the first member to move it toward the stop lug, and means on said first member moved into the path of movement of said stop lug whereby the shaft is stopped at a predetermined initial position.

14. In a machine of the class described, mechanism driven by cloth or like material drawn therethrough in one direction and including spring means for reversing the direction of movement of the mechanism when free to do so, stop means for stopping the mechanism at a predetermined point on said return movement of the mechanism, and means for checking the speed of movement of said mechanism slightly prior to the stopping thereof, the mechanism being entirely free at all other times to move under the influence of the spring means or when actuated by the cloth or like material.

15. In a machine of the class described, mechanism driven by cloth or like material drawn therethrough in one direction, means for returning the mechanism to initial position when free to do so, and means for checking the speed of movement of the return of the mechanism to initial position slightly prior to the arrival to initial position, the mechanism being otherwise entirely free at all other times to move either under the influnce of the return means or when actuated by the cloth or like material.

In testimony whereof I affix my signature.

ANTHONY VANDERVELD.